United States Patent [19]

Fisher et al.

[11] 3,928,311

[45] Dec. 23, 1975

[54] NOVEL QUATERNIZED HETEROCYCLIC MONOAZO DYES

[75] Inventors: John G. Fisher; James M. Straley, both of Kingsport, Tenn.

[73] Assignee: Eastman Kodak Company, Rochester, N.Y.

[22] Filed: Mar. 15, 1973

[21] Appl. No.: 341,416

Related U.S. Application Data

[63] Continuation of Ser. No. 661,215, Aug. 17, 1967, abandoned, which is a continuation-in-part of Ser. Nos. 484,720, Sept. 2, 1965, abandoned, and Ser. No. 484,721, Sept. 2, 1965, abandoned.

[52] U.S. Cl. .............. 260/156; 260/153; 260/154; 260/155; 260/157; 260/158; 260/162; 260/244 R; 260/248 CS; 260/249.5; 260/251 A; 260/256.4 F; 260/288 R; 260/294.9; 260/296 B; 260/305; 260/306.7; 260/307 FA

[51] Int. Cl.² ........................................ C09B 43/00

[58] Field of Search........ 260/146 R, 147, 153, 154, 260/156, 157, 158, 162, 163

[56] References Cited

UNITED STATES PATENTS

| | | | |
|---|---|---|---|
| 2,432,419 | 12/1947 | Heimbach ...................... | 260/154 X |
| 2,569,418 | 9/1951 | Kellog ............................. | 260/154 |
| 2,790,172 | 4/1957 | Rudner .......................... | 260/158 X |
| 3,420,813 | 1/1969 | Mueller et al. ................. | 260/156 |

*Primary Examiner*—Charles F. Warren

[57] ABSTRACT

The quaternized heterocyclic monoazo dyes having as a diazo component a nitrogen containing cyclic group linked through the azo bridge to an imidazo heterocyclic coupler prepared by quaternization of the intermediate azo dye, are useful as dyes for acyclic, modacrylic and acid-modified polyester textile materials.

13 Claims, No Drawings

NOVEL QUATERNIZED HETEROCYCLIC MONOAZO DYES

This application is a continuation of our copending application Ser. No. 661,215, now abandoned filed Aug. 17, 1967, for "Novel Monoazo Compounds and Cations", which copending application was a continuation-in-part of our applications Ser. Nos. 484,720 484,721, now abandoned, filed on Sept. 2, 1965, for "Heterocyclic Azo Dyes" and "Heterocyclic Cationic Azo Dyes", respectively.

This invention relates to novel monoazo compounds useful as dyes for hydrophobic textile materials such as polyester and cellulose acetate and to novel cationic monoazo compounds useful as dyes for acrylic, modacrylic, and acid-modified polyester textile materials.

The novel compositions of matter have the formula

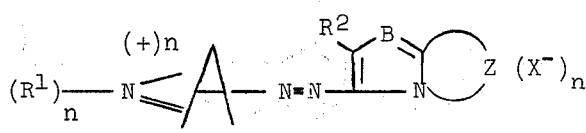

wherein
A represents the remainder of a 5 or 6 membered heterocyclic ring system attached to the azo group through a ring carbon atom, the ring atoms of A consisting of carbon or carbon and at least one sulfur or nitrogen atom, the non-azo nitrogen ring atom to which A is attached being in conjugation with the azo group.
$R^1$ represents lower alkyl or benzyl;
n represents 0 or 1;
$R^2$ represents a phenyl group;
B represents N or CH;
Z represents the remainder of a heterocyclic ring system which, with the carbon and nitrogen atoms to which Z is attached, completes a 5 or 6 membered ring, the ring atoms of Z consisting of carbon or carbon and at least one nitrogen, sulfur or oxygen atom; and
X represents an anion.

The unquaternized compounds of the invention, i.e., when n is 0, dye hydrophobic textile materials such as polyester, cellulose acetate, and polyamide fibers in a broad range of shades. The cations of the invention, i.e., when n is 1, have excellent affinity for acrylic, modacrylic, and acid-modified textile materials, and, when applied thereto by conventional means, display excellent properties such as, for example, fastness to light and wet processing.

Examples of the diazo components from which the unsaturated residue represented by A is derived include the thiazoles and benzothiazoles, i.e. A represents

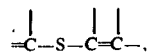

the pyrazoles, i.e. A represents

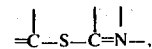

the 1,3,4-thiadiazoles, i.e. A represents

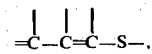

the isothiazoles, i.e. A represents

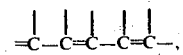

the pyridines and quinolines, i.e. A represents

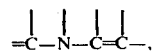

the 2-benzimidazoles, i.e. A represents

and the 1,2,4-triazoles, i.e. A represents $$-N=C-N-C=.$$

The carbon atoms of the diazo component, i.e. the groups collectively represented by A and N in formula (I) except, of course, the carbon atom attached to the azo groups, can be substituted with various substituents including a fused carbocyclic ring which may also be substituted. Examples of such substituents are hydrogen, lower alkyl, lower alkoxy, lower alkanoylamino, aroylamino, nitro, halogen, cyano, lower alkylsulfonyl, arylsulfonyl, carbamoyl, lower alkylcarbamoyl, di-lower alkylcarbamoyl, benzamido, lower alkoxycarbonyl, hydroxy, lower alkanoyl, aroyl, lower alkylsulfonamido, sulfamoyl, lower alkylsulfamoyl, di-lower alkylsulfamoyl, thiocyanato, alkythio, aryl, aryloxy, etc. As used herein, the work "lower" denotes an alkyl moiety having up to about 4 carbon atoms.

Examples of the alkyl and alkoxy groups that can be present on the diazo component includes methyl, ethyl, propyl, isopropyl, butyl, isobutyl, methoxy, ethoxy, propoxy, and substituted alkyl such as cyanoalkyl, e.g. 2-cyanoethyl, haloalkyl, e.g. 2-chloroethyl, 3-bromopropyl, trifluoromethyl, nitroalkyl, e.g. 2-nitroethyl, hydroxyalkyl, 2-hydroxyethyl, 2,3-dihydroxypropyl, etc. Bromine and chlorine are representative of the halogen atoms. Acetyl, propionyl, butyryl, acetamido, propionimido, and butyramido are representative of the alkanoyl and alkanoylamino groups that can be present on the diazo component.

Typical alkylsulfonyl and alkylsulfonamido groups that can be present on the diazo component of the compounds and cations of the invention are methylsulfonyl, ethylsulfonyl, propylsulfonyl, butylsulfonyl, 2-cyanoethylsulfonyl, methylsulfonamido, ethylsulfonamido, butylsulfonamides, etc. Examples of the alkoxycarbonyl groups include methoxycarbonyl, ethoxycarbonyl, propoxycarbonyl, butoxycarbonyl, etc. Typical of the alkyl groups of the alkylthio or substituted carbamoyl or substituted sulfamoyl groups that can be present on the diazo component are methyl, ethyl, propyl, isopropyl, butyl, etc.

Examples of the aryl groups that can be present on the diazo compound include monocyclic, carbocyclic aryl such as phenyl and phenyl substituted with lower alkyl, lower alkoxy, halogen, nitro, cyano, etc. The aryl moiety of the aroyl, aroylamino and arylsulfonyl groups can be unsubstituted, e.g. benzoyl, benzamido, phenylsulfonyl, or substituted with the groups mentioned above in the definition of aryl.

Any secondary nitrogen atoms present in the group represented by A can be unsubstituted or substituted with lower alkyl, lower alkylsulfonyl, aryl, or aroylamino as those groups are defined above. Examples of diazo groups containing a secondary nitrogen are the pyrazoles, the benzimidazoles, and the triazoles.

The examples and types of substituents described above are illustrative and not limitative. Various substituents that can be present on the diazo component will be apparent to those skilled in the art.

Examples of the alkyl groups represented by $R^1$ include methyl, ethyl, propyl, isopropyl, butyl and phenylalkyl groups such as benzyl. Preferably $R^1$ is methyl or ethyl.

The phenyl groups represented by $R^2$ can be unsubstituted or substituted with lower alkyl, lower alkoxy, halogen, nitro, cyano, etc. Specific examples of such phenyl groups include, but are not limited to, phenyl, p-tolyl, m-ethyl-phenyl, p-anisyl, p-chlorophenyl, o-bromo-p-tolyl, o,p-dichlorophenyl, p-nitrophenyl, and p-cyanophenyl.

The carbon atoms of the unsaturated, divalent groups represented by Z can be unsubstituted or substituted similar to the carbon atoms of the diazo component. Examples of the ring atoms that Z can represent includes

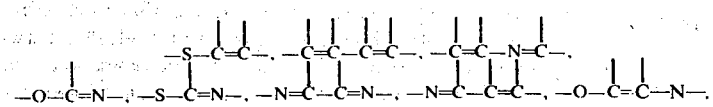

Typical of the groups represented by the divalent chain Z include the following groups.

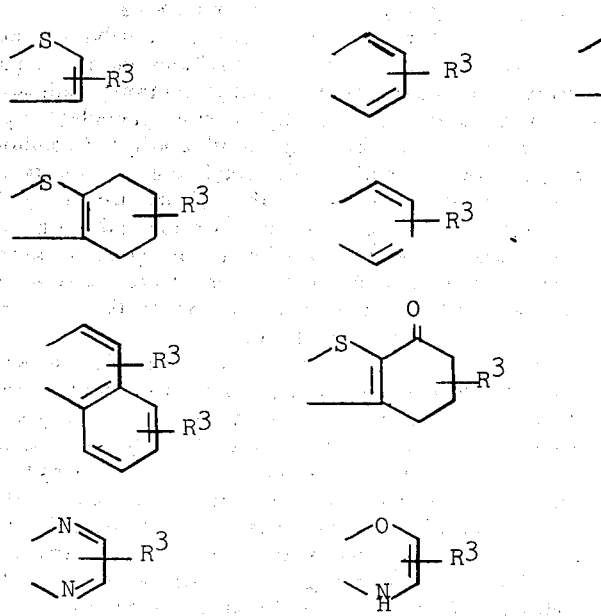

wherein $R^3$ represents hydrogen or one or more substituents described above including those substituents that can be present on the carbon atoms of the group represented by A. Preferably, $R^3$ represents not more than two substituents selected from the group consisting of alkyl and phenyl groups.

A particularly preferred group of the compounds of the invention are those containing an azole diazo component having the formula:

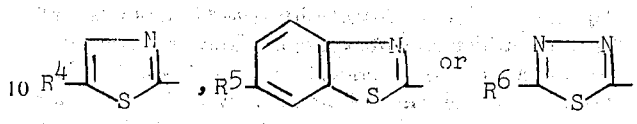

wherein $R^4$ represents nitro, halogen, cyano, or lower alkylsulfonyl;

$R^5$ represents nitro, cyano, lower alkylsulfonyl, lower alkoxycarbonyl, or thiocyanato; and $R^6$ represents lower alkythio, lower alkylthio substituted with lower alkoxycarbonyl, or lower alkylsulfonyl.

A preferred group of the cationic azo compounds of the invention contain an azole diazo component having the formula:

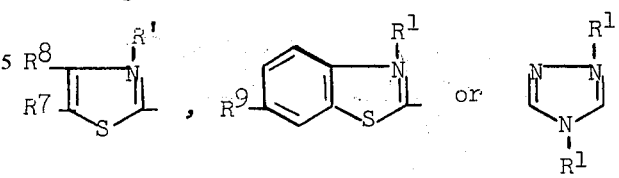

wherein $R^1$ represents methyl or ethyl;

$R^7$ represents hydrogen, thiocyanato, lower alkyl, or lower alkylsulfonyl;

$R^8$ represents hydrogen, lower alkyl, phenyl, or phenyl substituted with lower alkyl, lower alkoxy, or halogen; and $R^9$ represents hydrogen, lower alkyl, lower alkoxy or halogen.

A preferred group of the coupler components of the novel compounds of the invention have the formula:

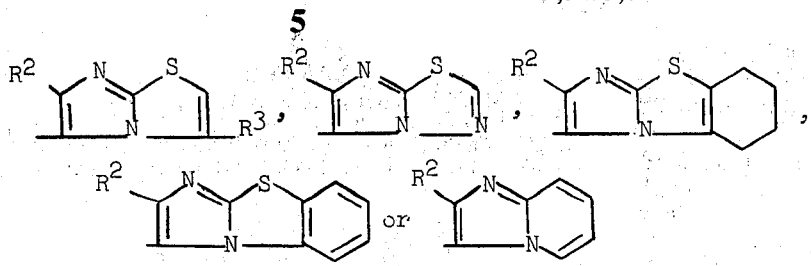

wherein
R[2] represents phenyl or phenyl substituted with lower alkyl; and
R[3] represents hydrogen, lower alkyl, phenyl or phenyl substituted with lower alkyl. Especially preferred are the coupler components conforming to the above structure to which R[3] is attached.

The monoazo compounds of the invention are prepared by diazotizing an amine having the formula (II) 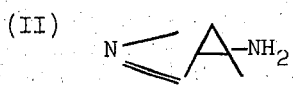

and coupling the resulting diazonium salt with a compound having the formula (III) 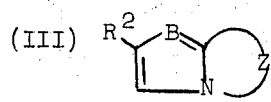

wherein A, R[2] and Z are defined above. The amines of formula (II) and the coupling procedures that can be used are well known in the art of dye chemistry.

The couplers of formula (III) are prepared by methods, or methods analagous to those, described in the literature. The reaction by which the couplers are prepared is illustrated by the following equation:

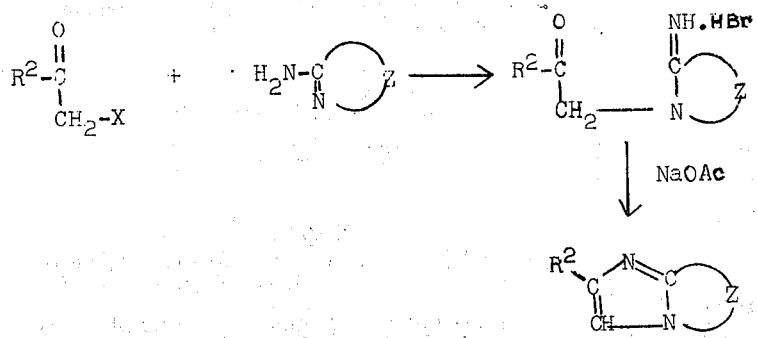

In addition to the examples below, the preparation of the couplers useful in preparing the novel compounds of the invention are also described in A. Chem., 2, 153 (1962); C.A., 58, 4532g; Ber., 95, 1128 (1962); Ber., 60, 1607 (1927); and J. Pharm. Soc. Japan, 57, 1050 (1937); C.A., 32, 33985.

Examples of the amines of formula (II) that can be used to prepare the novel compounds include 2-aminothiazole, 2-amino-4-phenylthiazole, 2-amino-4,5-dimethylthiazole, 2-amino-5-nitrothiazole, 2-amino-5-methylsulfonylthiazole, 2-amino-5-thiocyanatothiazole, 2-amino-5-ethoxycarbonylmethylthiothiazole, 2-amino-5-bromothiazole, 2-amino-6-methylsulfonylbenzothiazole, 2-amino-6-methoxybenzothiazole, 2-amino-5,6-dimethylbenzothiazole, 2-amino-4,6-dichlorobenzothiazole, 2-amino-6-cyanobenzothiazole, 2-amino-6-nitrobenzothiazole, 2-amino-6-sulfamoylbenzothiazole, 2-amino-6-dimethylsulfamoylbenzothiazole, 2-amino-6-trifluoromethylbenzothiazole, 2-amino-5-methyl-6-acetylbenzothiazole, 2-amino-6-ethoxycarbonylbenzothiazole, 2-amino-6-acetamidobenzothiazole, 2-amino-6-thiocyanato-benzothiazole, 2-amino-6-carbamoylbenzothiazole, 2-amino-5-methylthio-1,3,4-thiadiazole, amino-5-(ethoxycarbonylmethylthio)-1,3,4-thiadiazole, 2-amino-methylsulfonyl-1,3,4-thiadiazole, 3-amino-1,2,4-triazole, 2-aminobenzimidazole, 2-amino-5-methylbenzimidazole, 2-amino-6-methylsulfonylbenzimidazole, 2-amino-6-chlorobenzimidazole, 3-aminoisothiazole, 3-amino-5-nitroisothiazole, 3-amino-4,5-dimethylisothiazole, 3-amino-5-cyanoisothiazole, 3-amino-5-methylsulfonylisothiazole, 3-aminopyrazole, 3-amino-4-cyanopyrazole, 3-amino-4-nitropyrazole, 3-amino-4-ethylpyrazole, 3-amino-4-ethoxycarbonylpyrazole, 2-aminopyridine, 4-aminopyridine and 4-aminoquinoline. In general, any amino-cyclic compound which can be diazotized, and conforms with the definition of the diazo component in formula (I), can be used to prepare the novel compounds of the invention.

The novel cationic compounds of the invention are prepared by treating the monoazo compounds described above with an alkylating agent at elevated temperature with or without an inert solvent. Suitable alkylating agents that can be used are the dialkyl sulfates, the alkyl halides, the aralkyl halides, the alkyl esters of aryl sulfonic acids, etc. Examples of such alkylating agents include dimethyl sulfate, diethyl sulfate, dipropyl sulfate, ethyl bromide, butyl bromide, methyl iodide, ethyl iodide, benzyl chloride, benzyl bromide, methyl-p-toluene sulfonate, butyl-p-toluene sulfonate, and ethyl benzenesulfonate.

Examples of the anions represented by X include Cl[-], Br[-], I[-], $CH_3SO_4^-$, $C_6H_5SO_3^-$, etc., the anion depending upon the method of isolation utilized and the particular quaternizing agent employed. The anion does not affect the utility of the cations of the invention as dyes nor does it affect the dye affinity of the cations for polyacrylonitrile textile materials. When the compounds are used to dye polyacrylonitrile textile material, the anion becomes associated with a positively charged ion derived from the polyacrylonitrile and is removed from the dye cation and polyacrylonitrile textile material, either in the quent washing of the dyed polyacrylonitrile textile material. Since the cation of a cationic azo dye is responsible for the color of the compound and the particular anion associated with the cation is not important, the cations of the novel cationic compounds of the invention are described in the Examples herein without being associated with any anion.

As is well known in the art of dye chemistry, the primary color of the compounds of the invention is attributable to the conjugation of the compounds and cations as shown in formula (I). For this reason, the groups represented by A, $R^2$, B and Z, as these groups are defined herein, are not important with respect to the usefulness of the compounds as dyes for the described textile materials. The groups represented by A, $R^2$, B and Z and the substituents, if any, that are present on these groups function primarily as auxochrome groups to vary the color of the compounds and cations.

The unquaternized and quaternized compounds of the invention and their preparation are further illustrated by the following examples.

PREPARATION OF THE COUPLERS

EXAMPLE 1
6,6-Dimethyl-8-keto-2-phenyl-5,6,7,8-tetrahydroimidazo[2,1-b]-benzothiazole A 0.08 m. quantity each of 2-amino-5,5-dimethyl-7-keto-4,5,6,7-tetrahydrobenzothiazole and α-bromoacetophenone are mixed in 150 ml. of chloroform and heated at reflux for 4 hours. The slurry is filtered hot and the insoluble intermediate product is suspended in 600 ml. of water containing 25 g. of sodium acetate. This suspension is heated slowly to boil over 2½ hours, then allowed to cool. The product is filtered off, washed well with water and dried yielding 12.5 g. of product melting at 175°–178°C. and having the structure:

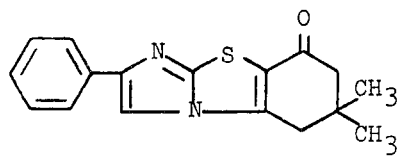

EXAMPLE 2  2-Phenylimidazo[1,2-a]pyrimidine

An equimolar mixture of 2-aminopyrimidine and α-bromoacetophenone are heated in absolute ethanol for several hours at 60°–70°C. Anhydrous ether is added to precipitate the hydrobromide of the product. The free base, melting at 202°C., is obtained by the action of aqueous $Na_2CO_3$ solution and has the formula:

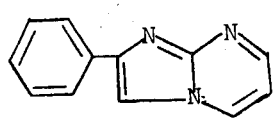

EXAMPLE 3
7-Methyl-2-phenylimidazo[1,2-c]pyrimidine

Substitution of 4-amino-6-methylpryimidine yields a coupler which melts at 244°C. and has the structure:

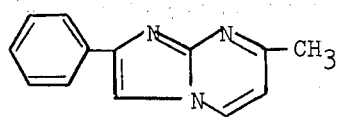

EXAMPLE 4  2-Phenylimidazo[2,1-b]benzothiazole

A 0.2 m. quantity each of 2-aminobenzothiazole and α-bromoacetophenone are mixed in 350 ml. of chloroform and heated at reflux for 1½ hours. After cooling, the solid intermediate product is filtered off and slurried in 2 1. water containing 10 ml. of 48% hydrobromic acid. This is then heated to a boil, filtered hot, and after allowing to cool the filtrate is basified with $NH_4OH$ to yield 6.8 g. of 2-phenylimidazo[2,1-b]benzothiazole melting at 108–10 having the formula:

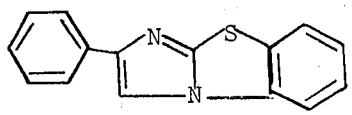

EXAMPLE 5  2-Phenylimidazo[1,2-a]pyridine 0.1 m. Quantities of 2-aminopyridine and α-bromoacetophenone are heated in 150 ml. of chloroform at reflux for 2 hours. The chloroform is evaporated and the oily residue taken up in 10% HCl, warmed, charcoal added and filtered. The filtrate is neutralized with $NH_4OH$ and the solid product isolated and recrystallized from ethanol. The yield of product is 12.7 g., melts at 135°–137°C. and has the structure:

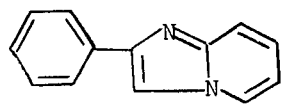

EXAMPLE 6
2-Phenyl-5,6,7,8-tetrahydroimidazo[2,1-b]benzothiazole 0.1 m. Quantities of 2-amino-4,5,6,7-tetrahydrobenzothiazole and α-bromoacetophenone in 100 ml. of chloroform are heated at reflux for 2 hours. After cooling, the solid is filtered off and slurried in 1 1. of water containing 40 g. of ammonium acetate. This suspension is heated to boiling over a 2-hour period and allowed to cool. The product is collected, washed with water and dried. The yield of product is 19.8 g. melting at 158°–160°C. and having the formula:

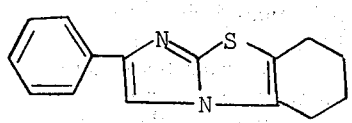

EXAMPLE 7
6-Phenylimidazo[2,1-b]-1,3,4-thiadiazole 10.1 g. of 2-amino-1,3,4-thiadiazole is dissolved in 160 ml. of ethanol; 19.9 g. of α-bromoacetophenone is added and the solution is heated and stirred at reflux for 1 hour. After cooling, the solid is filtered off and dissolved in 750 ml. of water and 40 ml. of 48% hydrobromic acid. This solution is heated at reflux for 1 hour, neutralized by addition of solid ammonium acetate and refluxed ½ hour longer. After cooling, the product is collected on a filter, washed with water and dried. The yield of product is 13 g. melting at 127°–130°C. It has the formula:

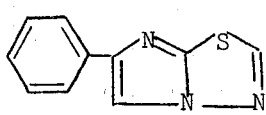

EXAMPLE 8  6-Phenylimidazo[2,1-b]thiazole

Bromine (21.5 ml.) is added to a solution of 50 g. of acetophenone and 0.1 g. of anhydrous AlCl$_3$ in 200 ml. of chlorobenzene. The addition requires about 20 minutes and the temperature of the reaction solution rises to about 35°C. Dry air is bubbled through the solution until all the gaseous HBr is removed. 2-Aminothiazole (24 g.) is added and the reaction mixture stirred and heated on a steam bath for 1 hour. The thick reaction mixture is filtered while still hot and the filter cake washed with hexane. The dry product is slurried in 200 ml. of methanol and then diluted with a solution of 80 g. ammonium acetate in 1600 ml. of water. This suspension is stirred and heated to 80°C., then filtered and the product thus obtained is washed with 4 l. of water. The yield is 70 g. of product which melts at 143°–144°C. and has the structure:

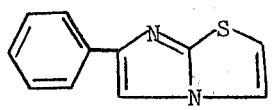

Additional couplers can be prepared by employing techniques either published in the literature or analagous to those described in the preceding examples. For example, the compound having the structure:

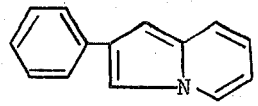

is prepared as described in Ber., 60, 1607 (1927) and the compound having the formula:

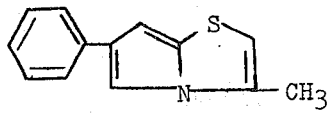

is prepared as described in J. Pharm. Soc. Japan, 57, 1050 (1937); C.A., 32, 33985.

PREPARATION OF THE MONOAZO COMPOUNDS

EXAMPLE 9

0.72 g. of NaNO$_2$ are added to 5 ml. of H$_2$SO$_4$ keeping the temperature below 70°C. 10 ml. of 1–5 acid are added to the nitrosyl sulfuric acid below 20°C., then with further cooling at 0° to 5°C. 1.47 g. of 2-amino-5-methylthio-1,3,4-thiadiazole are added. A second portion of 10 ml. of 1–5 acid is added below 5°C. and the diazotization is completed by stirring for two hours at 3° to 5°C. This diazo solution is then added to a fine suspension of the hydrochloride of the coupler prepared as follows: 2.0 g. of 6-phenylimidazo[2,1-b]-thiazole is dissolved by heating in 400 ml. of water containing 5 ml. of conc. HCl, ice is then added which precipitates the hydrochloride salt of the coupler in fine suspension. The coupling mixture is buffered to a pH of 4 to 5 by addition of solid ammonium acetate. After intermittant stirring for two hours, the product is collected on a funnel, washed well with water and dried at room temperature. This compound imparts fast orange shades to cellulose acetate and polyester fibers. It has the following structure:

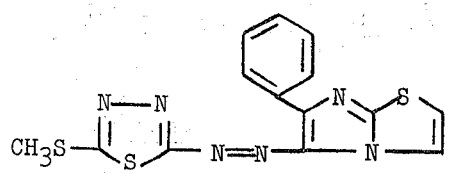

EXAMPLE 10

When the 2-amino-5-methylthio-1,3,4-thiadiazole of Example 9 is replaced with 1.61 g. of 2-amino-5-ethylthio-1,3,4-thiadiazole and the procedure of Example 9 is duplicated, a dye is obtained which dyes cellulose acetate and polyester fibers in fast orange shades. It has the structure:

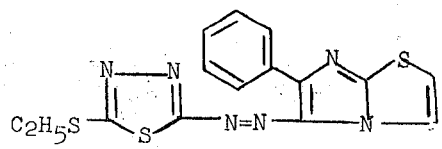

EXAMPLE 11

The procedure described in Example 9 is repeated using 2.19 g. of 2-amino-5-ethoxycarbonylmethylthio-1,3,4-thiadiazole in place of the thiadiazole used in that Example. The product obtained imparts orange shades to polyester and cellulose acetate fibers and has the formula:

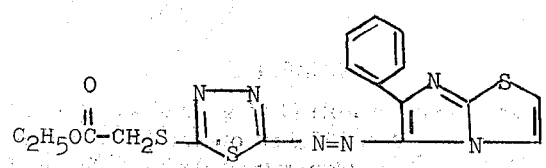

EXAMPLE 12

According to the procedure described in Example 9, 1.79 g. of 2-amino-5-methylsulfonyl-1,3,4-thiadiazole is diazotized and coupled with 2.0 g. of 6-phenylimidazo[2,1-b]thiazole. The product obtained gives reddish-orange dyeings on polyester fibers and has the formula:

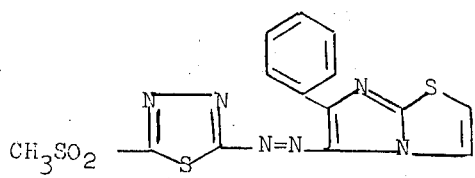

The azo compounds described in the Examples of Table I are prepared according to the procedure described in Example 9 by diazotizing the appropriate compound of formula (II) and coupling it with the appropirate coupler having formula (III). The coupounds conform to the general formula:

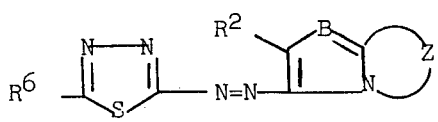

minutes at −5° to −10°C. This solution is added to a suspension of 2.0 g. of the hydrochloride of 6-phenylimidazo[2,1-b]thiazole and coupling is carried out as described in Example 9. The compound obtained imparts pink shades to cellulose acetate and polyester fibers and has the structure:

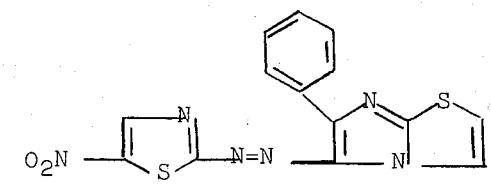

EXAMPLE 23

The procedure described in Example 22 is repeated using 2.2 g. of 2-amino-5-N-butyl-sulfonylthiazole in place of the 2-amino-5-nitrothiazole. The compound thus obtained imparts a fast orange shade to polyester fibers and has the formula:

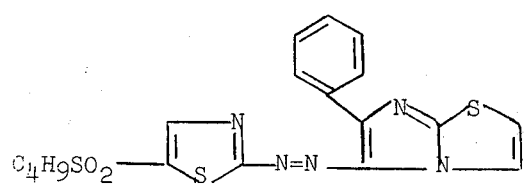

TABLE I

| Example No. | $R^6$ | $R^2$ | B | Z | Color on Polyester Fibers |
|---|---|---|---|---|---|
| 13 | $CH_3S-$ | phenyl | N | (S-containing ring with O, fused cyclohexanone) | orange |
| 14 | $CH_3S-$ | phenyl | N | (S-containing ring with $CH_3$, $CH_3$) | orange |
| 15 | $CH_3S-$ | phenyl | N | (S-ring with $CH_3$) | orange |
| 16 | H | phenyl | N | (S-ring) | yellow |
| 17 | $C_2H_5S-$ | phenyl | N | (S-ring with O, $CH_3$, $CH_3$) | golden-yellow |
| 18 | $C_2H_5SO_2-$ | phenyl | N | (S-ring) | reddish orange |
| 19 | H | phenyl | CH | (S-ring) | yellowish orange |
| 20 | H | phenyl | CH | (S-ring with $CH_3$) | orange |
| 21 | H | phenyl | CH | phenyl | yellow |

EXAMPLE 22

2-amino-5-nitrothiazole (1.45 g.) is dissolved in 6.8 ml. of conc. $H_2SO_4$ and 12.5 ml. of water at about room temperature. This solution is treated with a solution of nitrosyl sulfuric acid containing 0.76 g. of $NaNO_2$ below −5°C. The diazotization is complete after 15

EXAMPLE 24

10 ml. of 1–5 acid [propionic to acetic] are added below 20°C. to a solution of nitrosyl sulfuric acid prepared from 0.72 g. of $NaNO_2$ and 5 ml. of concentrated $H_2SO_4$. 1 g. of 2-aminothiazole is then added keeping the temperature below 5°C., followed by a second 10 ml. portion of 1–5 acid at the same temperature. The diazotization is complete after stirring at 3°–5°C. for 2 hours. The diazo solution is added to an internally ice cooled solution of 2.0 g. of 6-phenylimidazo[2,1-b]thiazole in dilute HCl. The pH of the coupling solution is raised to 4 by addition of solid NH₄OAc. After the coupling is complete the product is collected on a filter, washed with water and dried at room temperature. The product dyes polyester fibers an orange shade.

EXAMPLE 25

1.0 g. of 2-aminothiazole is diazotized as described in Example 24. It is coupled to 1 g. of 6-phenylimidazo[2,1-b]-1,3,4-thiadiazole, prepared as described above, in 30 ml. of 1–5 acid cooled in an ice bath. The mineral acid is neutralized with NH₄OAc keeping to the temperature below 10°C. The coupling is completed by intermittent stirring for 2 hours without further cooling.

The compounds described in Table II are prepared by diazotizing the appropriate aminothiazole and coupling it with the appropriate coupler compound of formula (III) according to the procedure described in Examples 22 and 24. The compounds conform to the following formula:

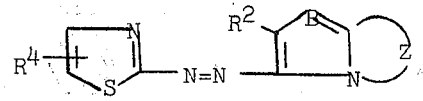

TABLE II

| Example No. | R⁴ | R² | B | Z | Color on Polyester Fiber |
|---|---|---|---|---|---|
| 26 | H | —C₆H₄— | N | thiazole (2-yl, fused benzo) | orange |
| 27 | H | Br—C₆H₄— | N | thiazol-2-yl | golden-yellow |
| 28 | 4-CH₃ | —C₆H₄— | N | thiazol-2-yl | golden-yellow |
| 29 | 4-C₆H₅ | —C₆H₄— | N | thiazol-2-yl | orange |
| 30 | 4-C₆H₅ | —C₆H₄— | N | 1,3,4-thiadiazol-2-yl | orange |
| 31 | 4-C₆H₅ | —C₆H₄— | N | 4-CH₃-thiazol-2-yl | orange |
| 32 | 5-SCN-4-C₆H₅ | —C₆H₄— | N | cyclohexanethiazole | red-orange |
| 33 | 5-SCN-4-C₆H₅ | —C₆H₄— | N | 1,3,4-thiadiazol-2-yl | orange |
| 34 | 5-SCN-4-C₆H₅ | —C₆H₄— | N | 4-CH₃-thiazol-2-yl | red-orange |
| 35 | 5-SCN-4-C₆H₅ | —C₆H₄— | N | thiazol-2-yl | red-orange |
| 36 | 5-SCN-4-CH₃ | —C₆H₄— | N | thiazol-2-yl | orange |
| 37 | 5-NO₂ | —C₆H₄— | N | thiazol-2-yl | pink |
| 38 | 5-Br | —C₆H₄— | N | (cyclohexene) | orange |
| 39 | 5-Br | —C₆H₄— | N | thiazol-2-yl | orange |
| 40 | 5-SO₂C₄H₉-n | —C₆H₄— | N | thiazol-2-yl | orange |
| 41 | 5-SO₂CH₃ | —C₆H₄— | N | thiazol-2-yl | orange |

TABLE II (continued)
| EXAMPLE NO. | R⁴ | R² | B | Z | Color on Polyester Fiber |
|---|---|---|---|---|---|
| 42 | H |  | N | 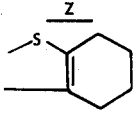 | yellow |
| 43 | H |  | N | 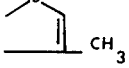 | yellow |
| 44 | H |  | N | 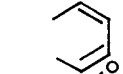 | yellow |
| 45 | H |  | N | 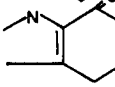 | yellow |
| 46 | H |  | N |  | yellow |
| 47 | H |  | N | 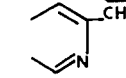 | yellow |
| 48 | H |  | N | 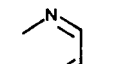 | yellow |
| 49 | H |  | N | 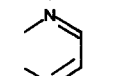 | yellow |
| 50 | H |  | N | 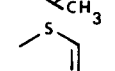 | yellow |
| 51 | H |  | N | 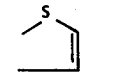 | yellow |
| 52 | 4-CH₃- |  | N | 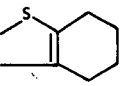 | yellow |
| 53 | 4-CH₃- |  | N | 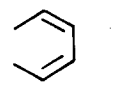 | yellow |
| 54 | 5-CH₃CO- |  | N | 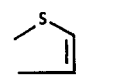 | orange |
| 55 | H |  | N | 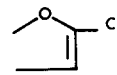 | yellow |
| 56 | H |  | N | 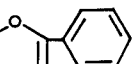 | yellow |
| 57 | H |  | N | 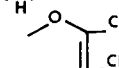 | yellow |
| 58 | H |  | N | 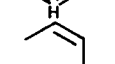 | yellow |
| 59 | H |  | CH | 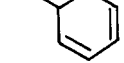 | yellow |
| 60 | H |  | CH | 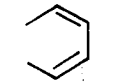 | reddish-yellow |
| 61 | H |  | CH |  | yellow |

EXAMPLE 62

1.50 g. of 2-aminobenzothiazole is dissolved in 24 ml. of water and 14 ml. of $H_2SO_4$. The solution is cooled to 0°C. and a solution of .72 g. of $NaNO_2$ in 5 ml. of $H_2SO_4$ is added at 0° to 5°C. The diazotization is completed by stirring at 3° to 5°C. for two hours. It is added to a finely divided suspension of the hydrochloride of 6-phenylimidazo-[2,1-b]thiazole prepared as follows: 2.0 g. of 6-phenylimidazo-[2,1-b]thiazole is dissolved by heating in 400 ml. of $H_2O$ and 5 ml. of conc. HCl, ice is added which precipitates the hydrochloride as a fine suspension. The coupling mixture is treated with solid ammonium acetate to bring the pH to about 4.5. After intermittent stirring for two hours the product is collected, washed well with water and dried. It imparts orange shades to cellulose acetate and polyester fibers and has the structure:

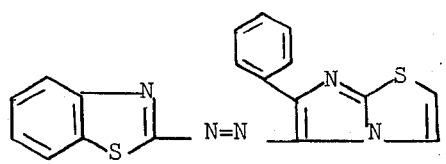

EXAMPLE 63

The procedure of Example 62 is repeated using 2.14 g. of 3-methyl-6-phenylimidazo[2,1-b]thiazole as the coupler. The compound obtained gives orange dyeings on polyester fibers and has the formula

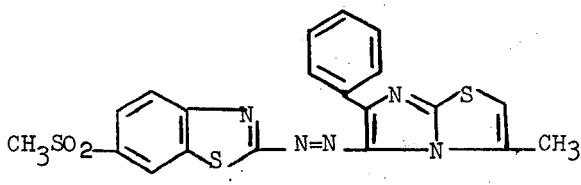

EXAMPLE 64

2-amino-6-methylsulfonylbenzothiazole (2.28 g.) is dissolved in 50 g. of 50% $H_2SO_4$. A solution of 0.72 g. of $NaNO_2$ in 5 ml. of conc. $H_2SO_4$ is added to this solution keeping the temperature below 5°C. The diazotization is completed by stirring for two hours at 3°–5°C. This diazo solution is added to a suspension of the hydrochloride of 2.0 g. of 6-phenylimidiazo-[2,1-b]thiazole prepared as described in Example 62, and the coupling carried out as therein described. The product obtained imparts fast orange shades to cellulose acetate and polyester fibers.

EXAMPLE 65

A solution of nitrosyl sulfuric acid prepared from 0.72 g. of $NaNO_2$ and 5 ml. of $H_2SO_4$ is treated with 10 ml. of 1:5 acid (1 part propionic acid:5 parts acetic acid) below 20°C., then 1.75 g. of 2-amino-6-cyanobenzothiazole is added keeping the temperature below 5°C. A second portion of 10 ml. of 1:5 acid is added at 3°-5°C. and the diazotization completed by stirring two hours at this temperature. This diazonium sulfate solution is reacted with 2.0 g. of 6-phenylimidazo-[2,1-b]thiazole as described in Example 62. The resulting azo dye imparts fast orange shades to cellulose acetate and polyester fibers.

EXAMPLE 66

0.72 g. of $NaNO_2$ is dissolved in 5 ml. of concentrated $H_2SO_4$ allowing the temperature to rise to about 65°C. 10 ml. of 1-5 acid is added below 20°C. followed by 1.8 g. of 2-amino-6-methoxybenzothiazole at 0° to 5°C. Then a second 10 ml. portion of 1-5 acid is added below 5°C. The diazotization is completed by stirring at 3° to 5°C. for 2 hours. The diazo solution is added to a cooled solution of 1.94 g. of 2-phenylimidazo[1,2-a]-pyridine in 25 ml. of 1-5 acid. The mineral acid is neutralized by addition of solid ammonium acetate keeping the temperature below 10°C. After 2 hours the coupling mixture is drowned in 600 ml. of water and the product is filtered and washed well with water. This azo compound imparts a red-orange shade to polyester fibers.

The compounds described in Table III are prepared by reacting the appropriate aminobenzothiazole with the appropriate coupler. The azo compounds conform to the formula:

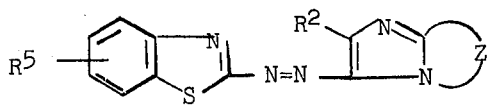

TABLE III

| EXAMPLE NO. | $R^5$ | $R^2$ | B | Z | Color on Polyester Fibers |
|---|---|---|---|---|---|
| 67 | 6-$CH_3SO_2$- | phenyl | N | thiazole fused cyclohexene | orange |
| 68 | 6-$CH_3SO_2$- | Br-phenyl | N | thiazole | orange |
| 69 | 6-$CH_3SO_2$- | phenyl | N | thiazole-N | yellow |
| 70 | 6-$CH_3SO_2$- | phenyl | N | S, O, $CH_3$, $CH_3$ substituted ring | orange |
| 71 | 6-$CH_3SO_2$- | phenyl | N | vinyl | orange |

TABLE III (continued)

| EXAMPLE NO. | R⁴ | R² | B | Z | Color on Polyester Fiber |
|---|---|---|---|---|---|
| 72 | 6-CH₃SO₂- |  | N |  | orange |
| 73 | 6-CH₃SO₂- |  | N | 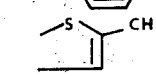 | orange |
| 74 | 6-CH₃SO₂-CH₃ |  | N | 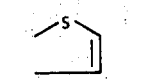 | orange |
| 75 | 6-CH₃O- |  | N | 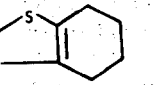 | red-orange |
| 76 | 6-CH₃O- |  | N | 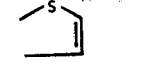 | red-orange |
| 77 | 6-CH₃O- |  | N | 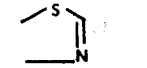 | tan |
| 78 | 6-CH₃O- |  | N |  | red-orange |
| 79 | 4,6-di-Cl |  | N |  | orange |
| 80 | 4,6-di-Cl |  | N | 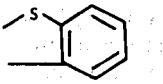 | orange |
| 81 | 6-NCC₃H₆SO₂- |  | N |  | orange |
| 82 | 6-NCC₃H₆SO₂ |  | N |  | orange |
| 83 | 6-NCC₃H₆S- |  | N | 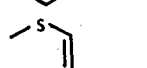 | red-orange |
| 84 | 6-NCC₃H₆S- |  | N | 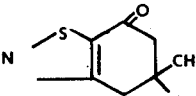 | red-orange |
| 85 | 6-NC- |  | N |  | orange |
| 86 | 6-CH₃- |  | N | 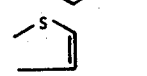 | orange |
| 87 | 6-NO₂- |  | N | 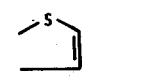 | orange |
| 88 | 6-H₂NSO₂- |  | N |  | orange |
| 89 | 6-(CH₃)₂NSO₂- |  | N | 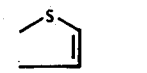 | orange |
| 90 | 6-CF₃- |  | N | 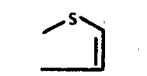 | orange |
| 91 | 6-CH₃CONH- |  | N | 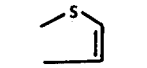 | orange |
| 92 | 6-H₂NCO- |  | N |  | orange |

TABLE III (continued)

| EXAMPLE NO. | R⁵ | R² | R | Z | Color on Polyester Fibers |
|---|---|---|---|---|---|
| 93 | 6-NCS- | phenyl | N | thiophene | orange |
| 94 | 6-C₂H₅OOC- | phenyl | N | thiophene | orange |
| 95 | 6-CH₃CO- | phenyl | N | thiophene | orange |
| 96 | 6-CH₃SO₂ | phenyl | CH | S-CH=C-CH₃ | orange |
| 97 | H | phenyl | CH | thiophene | yellow |
| 98 | H | phenyl | N | S-CH=C-CH₃ | yellowish-orange |
| 99 | H | phenyl | N | S-CH=C-phenyl | yellowish-orange |
| 100 | H | phenyl | N | thiazole | yellowish-orange |
| 101 | H | phenyl | N | S-cyclohexene | yellowish-orange |
| 102 | H | phenyl | N | S-pyridyl | yellowish-orange |
| 103 | 6-CH₃ | phenyl | N | S-CH=C-phenyl | yellow |
| 104 | 6-CH₃ | phenyl | N | S-cyclohexene | yellow |
| 105 | 4,6-di-CH₃ | phenyl | N | thiophene | yellow |
| 106 | 6-Cl | phenyl | N | thiophene | orange |
| 107 | 6-CH₃S- | phenyl | N | thiophene | orange |
| 108 | 4-HOC₂H₄- | phenyl | N | thiophene | yellow |
| 109 | H | phenyl | N | O-C(CH₃)=CH- | yellowish orange |
| 110 | H | phenyl | N | O-C(phenyl)=CH-NH | yellowish orange |
| 111 | H | phenyl | N | O-C(CH₃)=C(CH₃)-NH | yellowish orange |
| 112 | H | phenyl | N | naphthyl | yellowish orange |
| 113 | H | phenyl | CH | naphthyl | yellow |

TABLE III (continued)

| EXAMPLE NO. | $R^5$ | $R^2$ | B | Z | Color on Polyester Fibers |
|---|---|---|---|---|---|
| 114 | H | 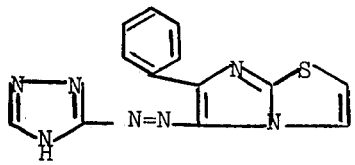 phenyl | CH | 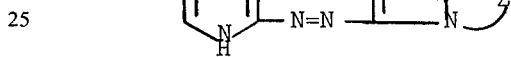 thiazolyl-CH₃ | yellow |

EXAMPLE 115

3-Amino-1(H), 1,2,4-triazole (0.84 g.) is dissolved in acetic acid (10 ml.) and conc. HCl (3ml.). This solution is cooled to 0°C. and treated with a solution of $NaNO_2$ (0.72 g.) in water keeping the temperature below 5°C. After the diazotization is complete, the solution is added to an ice cooled solution of 6-phenylimidazo (2,1-b) thiazole in 1–5 acid (20 ml.). The coupling mixture is neutralized to congo brown by addition of solid $NH_4OAc$ keeping the temperature below 10°C. After completion of coupling (as shown by a negative R-salt test) water is added and the yellow solid collected, washed with water and air dried to yield 2.6 g. The product has the formula:

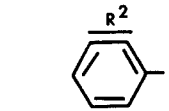

EXAMPLE 116

According to the procedure described in Example 115, 3-amino-1(H),1,2,4-triazole (0.84 g.) is diazotized and coupled with 2-phenylimidazo (2,1-b) benzothiazole. The azo compound obtained has the structure:

The compounds of the Examples set forth in Table IV are prepared by diazotizing the appropriate aminotrizole and coupling the resulting diazonium salt with the appropriate coupler. The compounds have the general formula:

The triazolylazo compounds can be used for dyeing polyester and cellulose acetate fibers. However, such use of the compounds is of secondary importance, the primary use of the triazolylazo compounds being precursors for the quanternized triazolylazo cations described hereinafter.

TABLE IV

| EXAMPLE NO. | $R^2$ | B | Z |
|---|---|---|---|
| 117 | 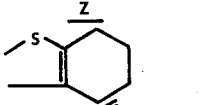 | N |  |
| 118 | 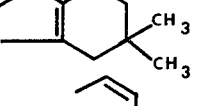 | N | 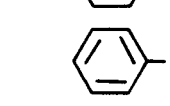 |
| 119 | 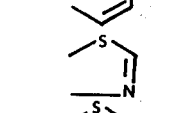 | N |  |
| 120 | 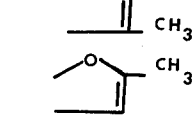 | N | 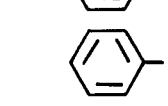 |
| 121 | 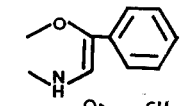 | N |  |
| 122 | 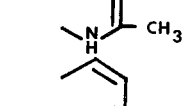 | N | 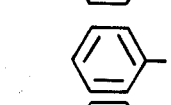 |
| 123 | 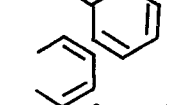 | N | 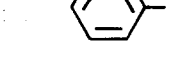 |
| 124 |  | N | |
| 125 | | N | |
| 126 | | CH | |
| 127 | | CH | |

By using procedures analagous to those described hereinabove, additional compounds can be prepared. In Table V, the diazotizable amine corresponds to formula (II) and the coupler corresponds to formula (III).

TABLE V

| Ex. No. | DIAZOTIZABLE AMINE | COUPLER |
|---|---|---|
| 128 | 3-amino-4-cyanopyrazole | 6-phenylimidazo[2,1-b]thiazole |
| 129 | 3-aminopyrazole | 2-phenylimidazo[2,1-b]benzothiazole |
| 130 | 3-aminopyrazole | 6,6-dimethyl-8-keto-2-phenyl-5,6,7,8-tetrahydroimidazo[2,1-b]benzothiazole |
| 131 | 3-amino-4-nitropyrazole | 6-phenylimidazo[2,1-b]thiazole |
| 132 | 3-amino-4-bromopyrazole | 3-methyl-6-phenylimidazo[2,1-b]thiazole |
| 133 | 3-amino-4-ethoxycarbonyl-pyrazole | 2-phenylimidazo[1,2-a]pyrimidine |
| 134 | 3-aminoisothiazole | 6-phenylimidazo[2,1-b]thiazole |
| 135 | 3-amino-5-nitroiso-thiazole | 2-phenylimidazo[1,2-a]pyridine |
| 136 | 4-aminopyridine | 6-phenylimidazo[2,1-b]thiazole |
| 137 | 4-aminoquinoline | 3-phenyl-6-phenylimidazo[2,1-b]thiazole |
| 138 | 2-aminobenzimidazole | 6-phenylimidazo[2,1-b]thiazole |
| 139 | 2-amino-6-methoxy-benzimidazole | 3-methyl-6-phenylimidazo[2,1-b]thiazole |
| 140 | 2-amino-6-methylsulfonyl-benzimidazole | 6-phenylimidazo[2,1-b]thiazole |

PREPARATION OF THE AZO CATIONS

EXAMPLE 141

One g. of the compound of Example 24 is heated in 5 ml. of dimethyl sulfate on the steam bath for 20 minutes. The solution is drowned in 150 ml. of ether and the precipitated solid is filtered off, dissolved in water and reprecipitated after filtering by addition of NaI. The cation obtained imparts fast red shades to acrylic fibers and has the structure:

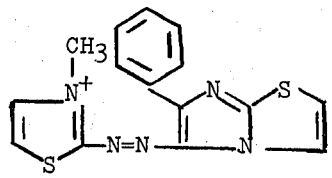

EXAMPLE 142

0.5 g. of the dye of Example 25 is quaternized as described in Example 141 except the period of heating in dimethyl sulfate is extended to 1 hour. The cation obtained dyes acrylic fibers in fast yellowish-red shades and has the structure:

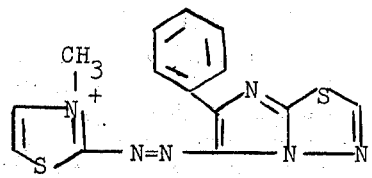

EXAMPLE 143

1.0 g. of the azo dye described in Example 42 is dissolved in 40 ml. of chlorobenzene at the boil. The solution is filtered into a flask containing 1 ml. of dimethyl sulfate and heated and stirred on the steam bath for 1.25 hours. After allowing to cool the solid is filtered off and washed with hexane. For purification the product is recrystallized from alcohol. This cation dyes acrylic fibers in fast red shades and has the structure:

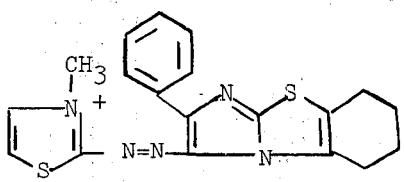

EXAMPLE 144

1 g. of the azo compound of Example 26 is dissolved in 20 ml. of triethylphosphate by warming on the steam bath. Dimethyl sulfate (0.5 ml.) is added and the solution is stirred and heated at 95°–100°C. until the dye is completely quaternized as shown by a test on paper strip chromatography. It is then cooled and the crystalline product is collected on a filter and washed with hexane. This cation imparts a red shade to acrylic fibers and has the structure:

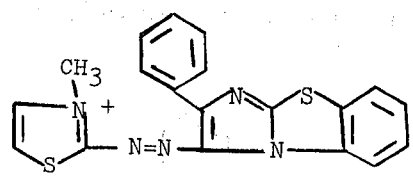

EXAMPLE 145

0.5 g. of the compound described in Example 45 is heated in 10 ml. of dimethylsulfate at 95°–100°C. for 2 hours. The brownish-red solution is drowned in ether and the precipitated dye is collected on a funnel, washed with ether and dried in a vacuum desiccator. This cation imparts red shades to acrylic fibers and has the structure:

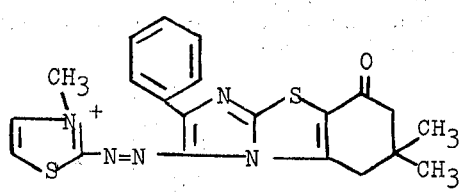

EXAMPLE 146

1 g. of the compound of Example 47 is heated in 10 ml. of dimethylsulfate for 2½ hours. The resulting orange solution is drowned in ether, the ether decanted from the sticky product and the latter dissolved in water by heating. After addition of a small amount of charcoal the hot solution is filtered and the dye is precipitated as the quaternary iodide by addition of potassium iodide. This cation imparts orange shades to acrylic fibers.

The thiazolylazo compounds set forth in Table VI that are described in Table II are quaternized according to the procedures described in Examples 141 through 146. The cations obtained give fast dyeings on acrylic, modacylic and acidmodified polyester fibers. The color given for each of the following compounds refers to dyeings of the resulting cation on acrylic fibers.

TABLE VI

| Compound of: | Color | Compound of: | Color |
|---|---|---|---|
| Example 43 | red | Example 29 | bluish-red |
| Example 44 | orange | Example 30 | red |
| Example 45 | red | Example 31 | bluish-red |
| Example 46 | red | Example 36 | violet |
| Example 47 | orange | Example 35 | violet |
| Example 48 | orange | Example 39 | violet |
| Example 49 | orange | Example 54 | red-violet |
| Example 27 | red | Example 55 | red |
| Example 50 | reddish-violet | Example 56 | red |
| Example 51 | reddish-violet | Example 57 | red |
| Example 28 | bluish-red | Example 58 | bluish-red |
| Example 50 | bluish-red | Example 59 | red |
| Example 53 | orange | Example 60 | bluish-red |

EXAMPLE 147

0.5 g. of the compound of Example 62 is quaternized by heating in 5 ml. of methyl-p-toluene sulfonate at 95° to 100°C. for 1 hour. The violet solution is poured into 100 ml. of hexane, stirred well and the hexane decanted from the precipitated dye. After rinsing with hexane the dye is purified by dissolving in 300 ml. of hot water and filtering. The cooled filtrate is treated with NaCl and ZnCl$_2$ to precipitate the product. This cation imparts fast bluish-red shades to acrylic fibers. It has the formula:

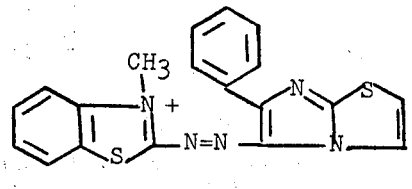

EXAMPLE 148

0.5 g. of the compound of Example 66 is quaternized with dimethyl sulfate according to the procedure described in Example 141. The quaternary iodide compound is recrystallized from 50 ml. of alcohol. The cation obtained imparts fast violet shades to acrylic fibers and has the formula:

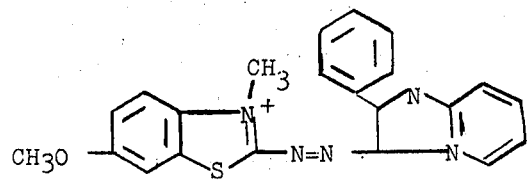

The cations obtained by quaternizing the benzothiazolylazo compounds of Examples 59–61 and Table III according to the procedure described in the above Examples give dyeings of excellent fastness properties on acrylic-type textile materials. The compounds of Table VII are quaternized to yield cations which give dyeings on acrylic fibers having the color shown.

TABLE VII

| Compound of: | Color | Compound of: | Color |
|---|---|---|---|
| Example 98 | bluish-red | Example 106 | red-violet |
| Example 99 | bluish-red | Example 93 | red-violet |
| Example 100 | red-violet | Example 64 | red |
| Example 101 | red-violet | Example 88 | bluish-red |

TABLE VII-continued

| Compound of: | Color | Compound of: | Color |
|---|---|---|---|
| | | Example 89 | bluish-red |
| Example 102 | red | Example 91 | bluish-red |
| Example 76 | reddish-blue | Example 92 | bluish-red |
| Example 78 | reddish-blue | Example 107 | bluish-red |
| Example 75 | reddish-blue | Example 95 | bluish-red |
| Example 86 | violet | Example 108 | violet |
| Example 103 | violet | Example 83 | bluish-red |
| Example 104 | violet | Example 109 | bluish-red |
| Example 105 | violet | Example 110 | bluish-red |

| Compound of: | Color |
|---|---|
| Example 111 | bluish-red |
| Example 112 | red-violet |
| Example 113 | bluish-red |
| Example 114 | bluish-red |

EXAMPLE 149

The dye (1.0 g.) of Example 115 is dissolved in dry dimethylformamide (4 ml.) and treated with dimethyl sulfate (1.8 ml.). After heating at 95°–100°C. for 50 min. the yellowish orange solution is drowned into water (100 ml.) containing NaCl (20 g.) and ZnCl$_2$ (2 g.). The yellow precipitate which forms is filtered off, washed with a very small amount of water and air dried. This cation imparts fast yellow shades to acrylic and modacrylic fibers and has the structure:

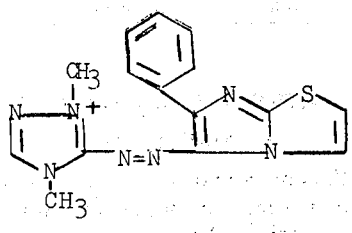

The cations resulting from the quaternization of the coupounds described in Example 116 and Table IV give excellent dyeings on acrylic-type textile fibers. If the secondary nitrogen atom of the triazole component, i.e. the number 4 nitrogen, of the azo compound is not substituted, the nitrogen atom is also alkylated during the quaternization reaction. The Table VIII illustrates the cations obtained from the compounds described in Example 116 and Table IV. The color refers to dyeings on acrylic fibers.

TABLE VIII

| Compound of: | Color | Compound of: | Color |
|---|---|---|---|
| Example 116 | reddish-yellow | Example 122 | yellow |
| Example 117 | yellow | Example 123 | yellow |
| Example 118 | yellow | Example 124 | yellow |
| Example 119 | yellow | Example 125 | orange |
| Example 120 | yellow | Example 126 | yellow |
| Example 121 | yellow | Example 127 | reddish-yellow |

EXAMPLE 150

The compound of Example 128 (1 g.) is heated in dimethyl sulfate (8 ml.) at 95°–100°C. for one hour. The reaction mixture is then drowned in ether and the ether decanted from the precipitate. The product is dissolved in water and precipitated by the addition of sodium chloride and zinc chloride. This cation imparts yellow shades to acrylic fibers and has the structure:

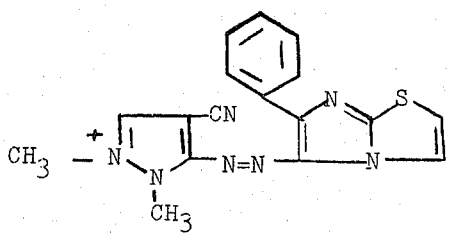

The monoazo compounds referred to in Table IX are quaternized by employing the above-described procedures. The color given is the color which the resulting cation imparts to acrylic fibers.

TABLE IX

| Compound of: | Color | Compound of: | Color |
|---|---|---|---|
| Example 129 | yellow | Example 133 | reddish-yellow |
| Example 130 | yellow | Example 134 | red |
| Example 131 | reddish-yellow | Example 135 | bluish-red |
| Example 132 | yellow | Example 136 | red |
| Example 137 | bluish-red | Example 139 | bluish-red |
| Example 138 | red | Example 140 | bluish-red |

EXAMPLE 151

The azo compound of Example 9 (1.0 g.) is heated in 5 ml. of dimethyl sulfate at 95°–100°C. for ½ hour. The solution is drowned in ether and the precipitate is filtered off, dissolved in water and reprecipitated after filtering by the addition of sodium chloride. The cation obtained imparts fast red shades to acrylic fibers and has the formula:

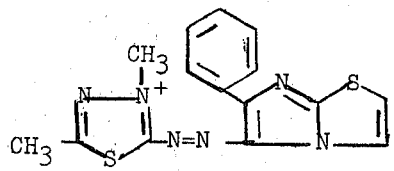

The compounds set forth below are quaternized according to the procedure of the preceding example. The color given refers to the shade of acrylic fibers dyed with the resulting cation.

| Compound of: | Color | Compound of: | Color |
|---|---|---|---|
| Example 10 | red | Example 16 | reddish-orange |
| Example 11 | red | Example 17 | red |
| Example 12 | bluish-red | Example 18 | bluish-red |
| Example 13 | reddish-orange | Example 19 | red |
| Example 14 | red | Example 20 | red |
| Example 15 | red | Example 21 | reddish-orange |

The nonoazo compounds of the invention can be used for dyeing hydrophobic fibers such as linear polyester, cellulose ester, polyamide, etc., fibers in the manner described in U.S. Pat. Nos. 2,880,050, 2,757,064, 2,782,187 and 3,043,827. The following example illustrates one method by which the compounds of the invention can be used to dye polyester textile materials.

EXAMPLE 152

An amount of 0.1 g. of the dye is dissolved in the dye pot by warming in 5 cc. of 2-methoxy ethanol. About 3–5 cc. of a 3% sodium lignin sulfonate aqueous solution is added, with stirring, until a fine emulsion is obtained. Water is then slowly added to a total volume of 300 cc. Then, 3 cc. of an emulsifiable nonionic, modified biphenyl derivative carrier (Carolid: Tanatex Chemical Corp.) are added and 10 grams of a textile fabric made of poly(ethylene terephthalate) fibers are entered. The fabric is worked 10 minutes without heat and then for 10 minutes at 80°C. The dye bath is then brought to the boil and held at the boil for one hour. Following this, the fabric is rinsed in warm water, then scoured in aqueous 0.2% soap, 0.2% soda ash solution. After scouring, the fabric is rinsed with water and dried.

When the compounds of this invention are used to dye polyamide textile materials, the above procedure can be employed except the Carolid dyeing assistant need not be used. When cellulose acetate fibers are dyed with the compounds, the above procedure can be followed omitting the Carolid dyeing assistant and carrying out the dyeing at 80°C. for one hour rather than at the boil.

The compounds of the invention can also be applied to polyester textile materials by the heat fixation technique of dyeing. This procedure is described in U.S. Pat. No. 2,663,612 and in the American Dyestuff Reporter, 42, 1 (1953).

Polymeric linear polyester materials of the terephthalate type are illustrative of the linear aromatic polyester textile materials that can be dyed with the compounds of our invention. Examples of linear polyester textile materials that can be dyed with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U.S. Pat. No. 2,901,466. Poly(ethylene terephthalate) polyester fibers are described, for example, in U.S. Pat. No. 2,465,319. The polymeric linear polyester materials disclosed in U.S. Pat. Nos. 2,945,010, 2,957,745, and 2,989,363, for example, can be dyed. The linear aromatic polyester materials specifically named have a melting point of at least 200°C. and are sold under the trade names "Kodel", "Dacron", and "Terylene".

Examples of the polyamide fibers that can be dyed with the compounds of the invention are those consisting of Nylon 66, made by the polymerization of adipic acid and hexamethylenediamine, Nylon 6, prepared from epsilon-aminocaproic acid lactam, and Nylon 8. The cellulose acetate fibers that can be dyed with the compounds of the invention include fibers consisting of either cellulose triacetate or partially hydrolyzed cellulose acetate.

The cationic monoazo compounds of the invention can be used for dyeing acrylic and modacrylic polymer fibers, yarns and fabrics a broad range of shades. Acrylic textile materials are those which consist of at least 85% acrylonitrile and modacrylic textile materials are those consisting of at least 35% but less than 85% acrylonitrile. The cationic compounds of the invention also give excellent dyeings on acid-modified acrylic textile materials such as the sulfonate modified acrylic fibers described in U.S. Pat. Nos. 2,837,500, 2,837,501 and 3,043,811. The novel cationic compounds can also be used to dye sulfonate modified polyester fibers such as are described in U.S. Pat. No. 3,018,272. Examples of the textile materials that are dyed with the cationic compounds of the invention are those sold under the trade names "Orlon", "Orlon 42", "Verel", "Acrilan", "Dynel", "Creslan", and "Dacron64". In general, the cationic compounds, when used as dyes on the described textile materials, exhibit improved fastness, for example, to washing; to alkaline perspiration, gas (atmospheric fumes) and sublimation.

Textile materials dyed by the cationic compounds of the invention are characterized by containing at least about 35% combined acrylonitrile units and up to about 95% acrylonitrile units, and modified, for example, by 65–5% of vinyl pyridine units as described in U.S. Pat. Nos. 2,990,393 (Re. 25,533) and 3,014,008 (Re. 25,539) or modified by 65–5% of vinylpyrrolidone units, for example, as described by U.S. Pat. No. 2,970,783, or modified with 65–5% acrylic ester or acrylamide units as described in U.S. Pat. Nos. 2,879,253, 2,879,254 and 2,838,470. Similar amounts of the other polymeric modifiers mentioned above are also useful. A preferred group of the copolymers readily dyeable with the dyes of the invention are the modacrylic polymers such as described in U.S. Pat. No. 2,831,826 composed of a mixture of (A) 70–95% by weight of a copolymer of from 30 to 65% by weight of vinylidene chloride or vinyl chloride and 70–35% by weight of acrylonitrile, and (B) 30– 5% by weight of a second polymer from the group consisting of ( 1 ) homopolymers of acrylamidic monomers of the formula

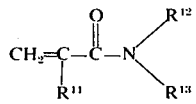

wherein $R^{11}$ is selected from the group consising of hydrogen and methyl, and $R^{12}$ and $R^{13}$ are selected from the group consisting of hydrogen and alkyl groups of 1–6 carbon atoms, (2) copolymers consisting of at least two of said acrylamidic monomers, and (3) copolymers consisting of at least 50% by weight of at least one of said acrylamidic monomers and not more than 50% by weight of a polymerizable monovinyl pyridine monomer.

Another type of modacrylic polymer that can be dyed with the cationic compounds of the invention is an acetone soluble mixture of (A) 70–95% by weight of a copolymer of 30–65% by weight of vinylidene chloride and 70–35% by weight of acrylonitrile and (b) 30–5% by weight of an acrylamide homopolymer having the above formula wherein $R^{11}$ and $R^{12}$ and $R^{13}$ are as described above. Specific polymers of that type contain 70–95% by weight of (A) a copolymer of from 30–65% by weight of vinylidene chloride and 70–35% by weight of acrylonitrile and (B) 30–5% by weight of a lower N-alkylacrylamide polymer such as poly-N-methacrylamide, poly-N-isopropylacrylamide and poly-N-tertiarybutylacrylamide.

The following example illustrates one way in which the cationic compounds of the invention can be used to dye acrylonitrile polymer textile material.

EXAMPLE 153

An amount of 0.1 gram of dye is dissolved by warming in 5 cc. of 2-methoxyethanol. A 2% aqueous solution of a non-ionic surfactant, such as Igepal CA (a polymerized ethylene oxide-alkylphenol condensation product), is added slowly until a fine emulsion is obtained and then the dye mixture is brought to a volume of 200 cc. with warm water. Five cc. of a 5% aqueous solution of formic acid or acetic acid are added and then 10 grams of fabric made from an acrylic fiber is entered and, in the case of "Orlon 42" acrylic textile material, the dyeing is carried out at the boil for one hour. In the case of materials made of "Verel" modacrylic fiber the dyebath temperature should not exceed 90°C. in order to avoid damage to the fiber. The dyed material is then washed well with water and dried.

The invention has been described in considerable detail with particular reference to certain preferred embodiments thereof, but it will be understood that variations and modifications can be effected within the spirit and scope of the invention as described hereinabove and as described in the appended claims.

We claim:
1. A compound having the formula

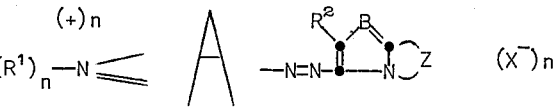

wherein

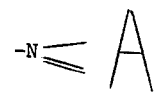

is 4-cyano-3-pyrazolyl, 3-pyrazolyl, 4-nitro-3-pyrazolyl, 4-bromo-3-pyrazolyl, 4-ethoxycarbonyl-3-pyrazolyl, 3-isothiazolyl, 5-methylsulfonyl-3-isothiazolyl, 5-nitro-3-isothiazolyl, 4,5-dimethyl-3-isothiazolyl, 5-cyano-3-isothiazolyl, 2-pyridyl, 4-pyridyl, 2-benzimidazolyl, 6-methoxy-2-benzimidazolyl, 6-methylsulfonyl-2-benzimidazolyl or a group having the formula

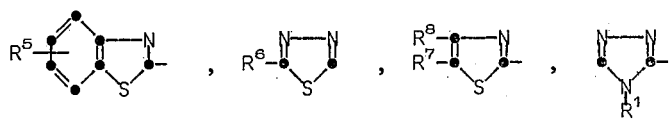

wherein
$R^5$ is hydrogen, nitro, cyano, lower alkylsulfonyl, lower alkoxycarbonyl, thiocyanato, lower alkyl, lower alkoxy, chlorine, or bromine;
$R^6$ is hydrogen, lower alkylthio, lower alkylthio substituted with lower alkoxycarbonyl, or lower alkylsulfonyl;
$R^7$ is hydrogen, thiocyanato, lower alkyl, lower alkylsulfonyl, nitro, cyano, or lower alkoxycarbonyl; and R⁸ is hydrogen, lower alkyl, phenyl, or phenyl substituted with lower alkyl, lower alkoxy, chlorine or bromine;
R¹ is lower alkyl or benzyl;
n is 0 or 1;
R² is phenyl or phenyl substituted with lower alkyl, lower alkoxy, chlorine, bromine, nitro, or cyano;
B is N;
Z is a group having the formula

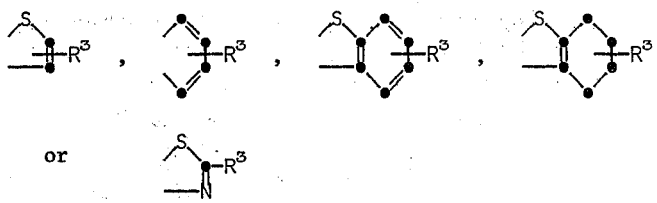

wherein R³ is hydrogen, lower alkyl, phenyl, or phenyl substituted with lower alkyl, lower alkoxy, chlorine or bromine; and
X is an anion.

2. A compound according to claim 1 having the formula

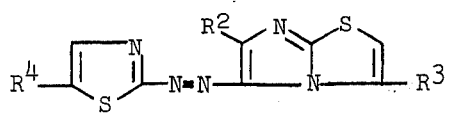

wherein
R⁴ represents nitro, chlorine, bromine, cyano, or lower alkylsulfonyl;
R² represents phenyl or phenyl substituted with lower alkyl; and
R³ represents hydrogen, lower alkyl, phenyl or phenyl substituted with lower alkyl.

3. A compound according to claim 2 wherein
R⁴ represents nitro or lower alkylsulfonyl;
R² represents phenyl; and
R³ represents hydrogen.

4. A compound according to claim 1 having the formula

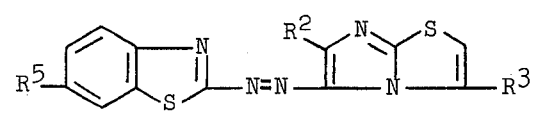

wherein
R⁵ represents nitro, cyano, lower alkylsulfonyl, lower alkoxycarbonyl, or thiocyanato;
R² represents phenyl; and
R³ represents hydrogen or methyl.

5. A compound according to claim 4 wherein
R⁵ represents methylsulfonyl, cyano or nitro;
R² represents phenyl; and
R³ represents hydrogen or methyl.

6. A compound according to claim 1 having the formula

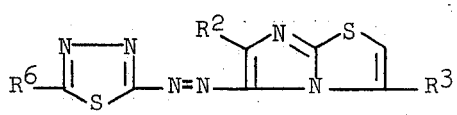

wherein
R⁶ represents lower alkylthio, lower alkylthio substituted with lower alkoxycarbonyl, lower alkylsulfonyl, or thiocyanato;
R² represents phenyl or phenyl substituted with lower alkyl; and
R³ represents hydrogen, lower alkyl, phenyl, or phenyl substituted with lower alkyl.

7. A compound according to claim 6 wherein
R⁶ represents methylthio, ethylthio, ethoxycarbonylmethylthio, or methylsulfonyl;
R² represents phenyl; and
R³ represents hydrogen.

8. A compound according to claim 1 having the formula

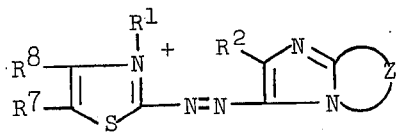

wherein
R¹ represents methyl or ethyl;
R² represents phenyl or phenyl substituted with lower alkyl;
R⁷ represents hydrogen, thiocyanato, lower alkyl, or alkylsulfonyl;
R⁸ represents hydrogen, lower alkyl, phenyl, or phenyl substituted with lower alkyl, lower alkoxy, chlorine, or bromine; and
Z represents

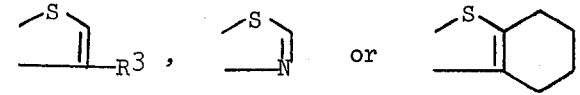

wherein
R³ represents hydrogen, lower alkyl, phenyl or phenyl substituted with lower alkyl.

9. A compound according to claim 8 wherein
R¹ represents methyl;
R² represents phenyl;
R³ represents hydrogen or methyl; and
R⁷ and R⁸ represent hydrogen.

10. A compound according to claim 1 having the formula

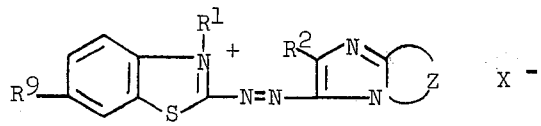

wherein
R¹ represents methyl or ethyl;
R² represents phenyl or phenyl substituted with lower alkyl;
R⁹ represents hydrogen, lower alkyl, lower alkoxy, chlorine or bromine; and
Z represents

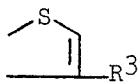 or 

wherein
R³ represents hydrogen, lower alkyl, phenyl or phenyl substituted with lower alkyl.

11. A compound according to claim 10 wherein
R¹ represents methyl;
R² represents phenyl;
R⁹ represents hydrogen or methoxy; and
R³ represents hydrogen.

12. A compound according to claim 1 having the formula

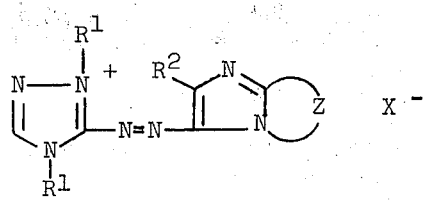

wherein
R¹ represents methyl or ethyl;
R² represents phenyl or phenyl substituted with lower alkyl; and
Z represents

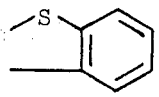 or 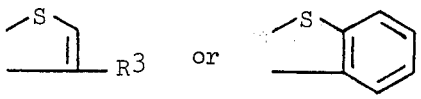

wherein R³ represents hydrogen, lower alkyl, phenyl, or phenyl substituted with lower alkyl.

13. A compound according to claim 12 wherein
R¹ represents methyl;
R² represents phenyl; and
R³ represents hydrogen.

* * * * *